(12) United States Patent
Badding et al.

(10) Patent No.: US 7,820,332 B2
(45) Date of Patent: Oct. 26, 2010

(54) ELECTROLYTE SHEET WITH REGIONS OF DIFFERENT COMPOSITIONS AND FUEL CELL DEVICE INCLUDING SUCH

(75) Inventors: Michael Edward Badding, Campbell, NY (US); Sean Matthew Garner, Elmira, NY (US); Sandra Lee Hagg, Corning, NY (US); Thomas Dale Ketcham, Big Flats, NY (US); Jeffrey Allen Miller, Elmira, NY (US); Dell Joseph St Julien, Watkins Glen, NY (US)

(73) Assignee: Corning Incorporated, Corning, NY (US)

( * ) Notice: Subject to any disclaimer, the term of this patent is extended or adjusted under 35 U.S.C. 154(b) by 1028 days.

(21) Appl. No.: 11/528,131

(22) Filed: Sep. 27, 2006

(65) Prior Publication Data

US 2008/0075984 A1      Mar. 27, 2008

(51) Int. Cl.
*H01M 8/12* (2006.01)
(52) U.S. Cl. .................................................. 429/400
(58) Field of Classification Search ............... 429/33
See application file for complete search history.

(56) References Cited

U.S. PATENT DOCUMENTS

| | | | |
|---|---|---|---|
| 4,221,650 A | 9/1980 | Friese et al. | 204/195 |
| 4,329,271 A | 5/1982 | Kemr et al. | 524/386 |
| 4,353,958 A | 10/1982 | Kita et al. | 428/329 |
| 4,396,480 A | 8/1983 | Hegedus et al. | 429/33 |
| 5,089,455 A | 2/1992 | Ketcham et al. | 501/104 |
| 5,273,837 A | 12/1993 | Aitken et al. | 429/30 |
| 5,290,323 A | 3/1994 | Okuyama et al. | 29/623.5 |
| 5,306,646 A | 4/1994 | Lauf | 437/2 |
| 5,314,508 A | 5/1994 | Taniguchi et al. | 29/623.5 |
| 5,518,829 A | 5/1996 | Satake et al. | 429/30 |
| 6,045,935 A | 4/2000 | Ketcham et al. | 429/30 |
| 6,361,893 B1 | 3/2002 | George et al. | 429/31 |
| 6,428,920 B1 | 8/2002 | Badding et al. | 429/30 |
| 2002/0076593 A1* | 6/2002 | Helfinstine et al. | 429/30 |
| 2002/0127344 A1 | 9/2002 | Pham et al. | 427/421 |
| 2002/0174935 A1 | 11/2002 | Burdon et al. | 156/89.11 |
| 2002/0174936 A1 | 11/2002 | Burdon et al. | 156/89.12 |
| 2002/0174937 A1 | 11/2002 | Burdon et al. | 156/89.12 |
| 2003/0013046 A1 | 1/2003 | Fonash et al. | 430/314 |
| 2005/0016839 A1 | 1/2005 | Horne et al. | 204/242 |
| 2006/0003213 A1 | 1/2006 | Ketcham et al. | 429/30 |
| 2006/0134491 A1* | 6/2006 | Hilchenko et al. | 429/33 |
| 2006/0199058 A1 | 9/2006 | Hiwatashi | 429/30 |

FOREIGN PATENT DOCUMENTS

DE          4307727          9/1994

(Continued)

*Primary Examiner*—Patrick Ryan
*Assistant Examiner*—Muhammad Siddiquee
(74) *Attorney, Agent, or Firm*—Svetlana Z. Short

(57) ABSTRACT

An electrolyte sheet comprising two major surfaces, the electrolyte sheet including regions of differing compositions, so that (i) at least one of these regions has at least 1.5 times higher ionic conductivity than at least one other region; (ii) wherein the at least one other region has 20% more tetragonal phase zirconia per volume than the least one region with higher ionic conductivity; and (iii) when viewed in cross-section taken through said major surfaces at least one of the regions exhibits a non-uniform thickness.

21 Claims, 8 Drawing Sheets

FOREIGN PATENT DOCUMENTS

| | | |
|---|---|---|
| EP | 1113518 | 4/2001 |
| EP | 1562244 | 9/2003 |
| EP | 1650821 | 4/2006 |
| WO | WO01/48855 | 7/2001 |
| WO | WO02/43937 | 6/2002 |
| WO | WO2004/055933 | 7/2004 |

* cited by examiner

ELECTROLYTE SHEET WITH REGIONS OF DIFFERENT COMPOSITIONS AND FUEL CELL DEVICE INCLUDING SUCH

FIELD OF THE INVENTION

The invention is a fuel cell using an inorganic electrolyte sheet useful for power generation, particularly solid oxide fuel cells (SOFCs), wherein the inorganic electrolyte sheet comprises regions of different compositions.

BACKGROUND OF THE INVENTION

Solid oxide fuel cells are well known, but have been limited to power sources that are not temperature cycled repeatedly. To be useful for an automotive power plant, a fuel cell needs to become operational quite fast, preferably faster than 5 minutes, more preferably less than two minutes and even more preferably less than 30 seconds. Energy requirements to keep a high temperature solid oxide type fuel cell hot all the time in an auto are prohibitive. Hence, as fuel cell would need to be heated almost every time an auto was used, the cell would need to withstand perhaps as many as 10 to 20 thousand heating cycles. Auxiliary electrical power units for long haul trucks would have similar requirements. Similar requirements would be needed for portable electric generators based on SOFC's, electrical power generating SOFC units for the home, small businesses or apartment complexes and other distributed electrical generation SOFC units.

Flexible thin ceramics have been described for example in co-assigned U.S. Pat. No. 5,089,455, some compositions of which would be useful electrolytes for fuel cells. Recently, U.S. Pat. No. 5,273,837 has described the use of such compositions to form a thermal shock resistant fuel cell.

The foregoing discussion is intended to show use of zirconia as an electrolyte is known, and use of $((LaSrMnO_3))$ and other expansion matched electrically conducting perovskite structures are known for use as air side electrodes, as well as use of zirconia/nickel composites for fuel side electrodes. In addition, metals, intermetallics and $LaCrO_3$ have been used for interconnect structures.

Notwithstanding, there continues to be a need for improved solid oxide fuel cells, particularly fuel cells capable of withstanding very high heating and/or thermal cycles cycles with enhanced electrical power output. Thus, electrolyte sheets need to be mechanically strong, to be capable of withstanding very high heating and/or thermal cycles, while simultaneously offering good ionic conductivity.

SUMMARY OF THE INVENTION

Briefly, the invention relates to a solid electrolyte fuel cell having an electrolyte sheet that can be interposed between at least one cathode and at least one anode, in which the electrolyte sheet has at least two regions of different compositions.

According to one aspect of the present invention, an electrolyte sheet comprises two major surfaces and has regions of differing compositions, so that (i) at least one of the regions has at least 1.5 times higher ionic conductivity than at least one other region; (ii) wherein said at least one other region has 20% more tetragonal phase zirconia per volume than the at least one region with higher ionic conductivity; and (iii) when viewed in cross-section taken through said major surfaces at least one of the regions exhibits a non-uniform thickness. Preferably, the least one other region has higher strength than the region(s) with higher ionic conductivity. Preferably, the electrolyte sheet is a thin, flexible, pre-sintered, polycrystalline ceramic sheet with at least two areas of different chemical compositions.

According to some of the embodiments, the at least one region of the electrolyte sheet includes a composition selected from at least one of: (a) zirconia doped with 6-10 mole % yttria; (b) zirconia doped with: 6-10 mole % ytterbia, lutetia, erbia, or thulia; (c) zirconia doped with 7-12 mol % scandia; and (d) mixtures of zirconia doped with 6-12 mole % of: yttria; ytterbia, lutetia, erbia, thulia; zirconia, and/or Scandia. According to some of the embodiments, the at least one other region includes a composition selected from: (a) at least one of: zirconia doped with 2-4 mole % yttria; zirconia doped with 2-4 mole % rare earth oxide (oxides of Nd, Sm, Eu, Gd, Tb, Dy, Ho, Er, Tm, Yb, Lu); zirconia doped with 9-12 mole % ceria; (b) zirconia doped with 1.5-5 mole % of $Y_2O_3$ or rare earth oxide, and 0.5-15 m % rare earth niobate or rare earth tanatalate (i.e. $YNbO_4$), (c) zirconia doped with 1.5-5 mole % Yttria or rare earth oxide, and 0.5-15 m % of: rare earth, magnesium, calcium, tungstate, or calcium molybdnate (i.e. $CaWO_4$), or (d) zirconia doped with 0.5-4 mole % yttria or rare earth oxide and 5-20 mole % $TiO_2$ or $SnO_2$ and mixtures there of. Preferably, additions of less than 10 volume percent alumina to the zirconia based compositions of these region(s), and more preferably less than 5 volume percent alumina, advantageously scavenge glass impurities to the triple points in slightly impure zirconia powders.

In a further aspect, the invention relates to thermal shock resistant solid electrolyte fuel cells incorporating an electrolyte sheet having regions of enhanced strength and regions of enhanced ionic conductivity and devices or assemblies incorporating such fuel cells.

According to one embodiment of the present invention the electrical power-generating solid oxide fuel cell assembly comprises:

a) a packet element having an enclosed interior formed at least in part by one or more compliant electrolyte sheets, wherein at least one electrolyte sheet comprises a plurality of regions of differing compositions;

b) one or a plurality of anodes disposed within the enclosed interior and supported on an interior surface of the compliant solid oxide sheet;

c) one or a plurality of cathodes supported on an exterior surface of the compliant solid oxide sheet at locations generally opposite the anodes on the interior surface;

d) fuel delivery means for supplying a fuel gas to the enclosed interior; and e) electrically conductive material connected to the anodes and cathodes for drawing electrical current from the assembly.

DESCRIPTION OF THE DRAWINGS

The invention may be further understood by reference to the drawings, wherein.

DETAILED DESCRIPTION

Figure 1A:
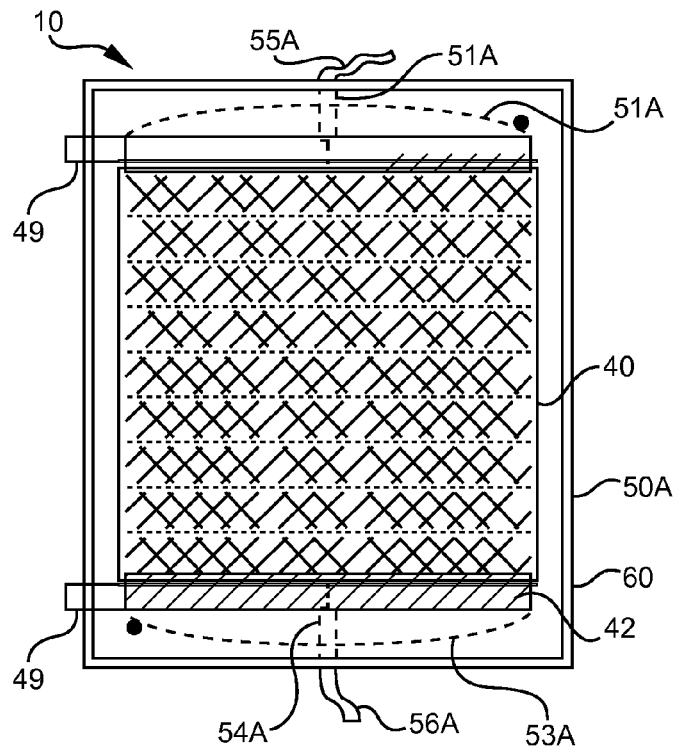
FIGS. 1A-1C present schematic top sectional and side cross-sectional elevational views of a framed SOFC assembly provided according to the invention.
Figure 1B:
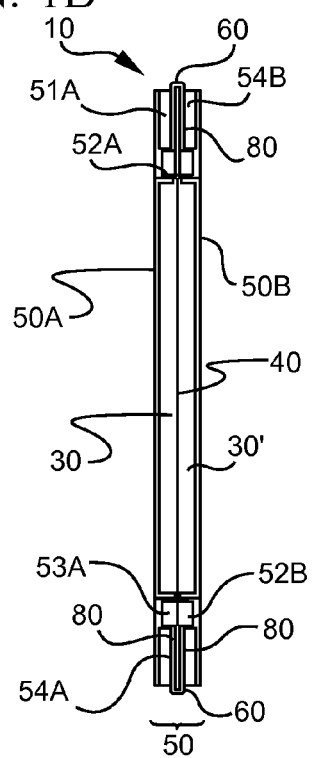
Figure 1C:
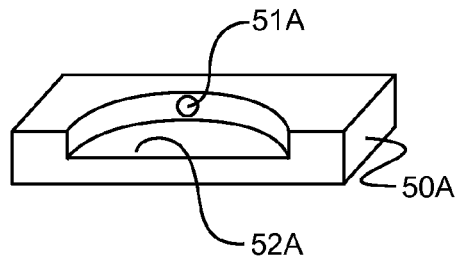
Figure 2:
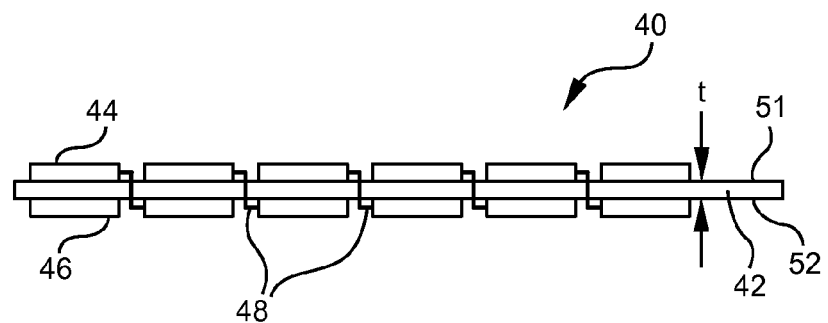
FIG. 2 presents schematic cross-sectional view of a portion of the SOFC device of FIGS. 1A-1C.

According to one embodiment of the present invention a portable SOFC assembly 10 depicted schematically in FIGS. 1A-1C comprises a small fuel cell packet 20 that includes a single fuel chamber 30 and a single oxidant gas chamber 30' formed by (i) a single multi-cell (electrolyte supported) fuel cell device 40 and (ii) a frame module 50 that supports the multi-cell fuel cell device 40. As shown in FIG. 2, the multi-cell device 40 includes an electrolyte sheet 42, a plurality of anodes 44 situated on one side of the electrolyte sheet 42 and a plurality of cathodes 46 situated on another side of the electrolyte sheet 42. The cathodes and anodes of this embodiment are electrically interconnected by vias (via interconnects) 48 that traverse through small holes (via holes) in the electrolyte sheet 42. Preferably, the electrolyte sheet 42 is a flexible ceramic sheet. Preferably, the electrolyte sheet 42 is less than 45 μm thick, more preferably less than 25 μm thick and more preferably is 4-20 μm thick. Examples of suitable compositions for such electrolyte sheets 42 include partially stabilized zirconias or stabilized zirconias doped with a stabilizing additive selected, for example, from the group comprising of the oxides of Y, Ce, Ca, Mg, Sc, Nd, Sm, Eu, Gd, Tb, Dy, Ho, Er, Tm, Yb, Lu, In, Ti, Sn, and toughening agents of Nb, Ta, Mo, and W and mixtures thereof. The detail description of the fuel cell assembly 10 is provided below, following the detail description of the exemplary electrolyte sheets and exemplary methods for producing such.

The electrolyte sheet 42 has regions $R_i$ of differing compositions. The regions or areas of the electrolyte sheet may contain different materials. Alternatively, these regions or areas of the electrolyte sheet 42 may include the same base material, but be either doped with different dopants, or be doped with different amounts of the same dopant(s). One or more of these regions may have a chemical composition optimized for providing optimal ionic conduction, while one or more of the other regions may be optimized, for example, to provide maximum mechanical strength. Alternatively, different regions of the electrolyte sheet may have different compositions to provide optimal performance in different temperature ranges. This is especially advantageous if different parts of the fuel cell device 40 are subjected to different temperatures due to strong temperature gradients across the fuel cell device.

The regions (or areas) of different compositions optimize the performance of the fuel cell device. For example, the electrolyte sheet 42 may have active areas (areas situated between the electrodes) that have high ionic conductivity, thus allowing the fuel cell device to operate at lower temperatures or with higher efficiency. If the fuel cell device is operated at lower temperatures, the stress due to thermal cycling and CTE expansion mismatches are reduced. Simultaneously, as described above, the fuel cell sheet 42 has areas or regions of high strength in the locations of maximum thermal-mechanical stresses, which allows the fuel cell device to operate at higher temperatures while reducing probability of device failure. It is preferable that the regions Ri have at least a 20 μm wide minimum cross-section, more preferably at least at least a 30 μm wide minimum cross-section, and most preferably at least a 50 μm wide minimum cross-section. It is also preferable that the regions have at least a minimum cross-sectional area of at least 400 μm, more preferably at least 1000 $μm^2$, and most preferably at least 2500 $μm^2$.

Suitable components for electrolyte sheets 42 are, for example, stabilized or partially stabilized zirconia that may be doped with a stabilizing additive such as oxides of Y, Ce, Ca, Mg, Sc, Nd, Sm, Eu, Gd, Tb, Dy, Ho, Er, Tm, Yb, Lu, In, Ti, Sn, Nb, Ta, Mo, W and mixtures thereof. A thin electrolyte sheet 42 (3 μm to 45 μm thick) may include 3 to 10 mole % of $Y_2O_3$—$ZrO_2$, preferably 3-6 mol % $Y_2O_3$, and more preferably 3-4 mol % $Y_2O_3$, which provides low resistive loss, high conductivity, with the lower yttria levels providing enhanced transformational toughening, and high thermal shock resistance. A thin electrolyte sheet 42 (3 μm to 45 μm thick) may also include up to 12 mole % of $Sc_2O_3$—$ZrO_2$, preferably less than 10 mole % $Sc_2O_3$ which provides low resistive loss and high ionic conductivity. Electrode layers can be, for example, Ni—$ZrO_2$, optionally with additions of Cu and/or $CeO_2$, for anodes and lanthanum strontium manganate (LSM)-$ZrO_2$ for cathodes, while current collector layers can be, for example, silver rich alloys, preferably silver—palladium alloys.

According to some of the embodiments, one region or set of regions includes a composition selected from: (a) zirconia doped with at least one of: 6-10 mole % of: yttria, ytterbia, lutetia, erbia, thulia; (b) zirconia doped with 7-12 mol % scandia; and (c) zirconia doped with a total mix of 6-12 mole % of: yttria; ytterbia, lutetia, erbia, thulia; zirconia or scandia; and the other region(s) includes a composition selected from at least one of: (a) zirconia doped with 2-4 mole % yttria; zirconia doped with 2-4 mole % rare earth oxide (oxides of Nd, Sm, Eu, Gd, Tb, Dy, Ho, Er, Tm, Yb, Lu); zirconia doped with 9-12 mole % ceria; (b) zirconia doped with 1.5-5 mole % rare earth oxide or $Y_2O_3$, and 0.5-15 m % of: yttrium or rare earth niobate or rare earth tanatalate (i.e. $YNbO_4$); (c) zirconia doped with 1.5-5 mole % yttria or rare earth oxide, and 0.5-15 mole % of yttrium rare earth, magnesium, calcium tungstate, or, yttrium or rare earth, magnesium, calcium-molybdnate (i.e. $CaWO_4$); or (d) zirconia doped with 0.5-4 mole % yttria or rare earth oxide, and 5-20 mole % $TiO_2$ or $SnO_2$, and mixtures thereof. Preferably, additions of less than 10 volume percent alumina to zirconia, and more preferably less than 5 volume percent alumina advantageously scavenge glass impurities to the triple points in slightly impure zirconia powders.

Preferably, the electrolyte sheet 42 is less than 45 μm thick and has a bending strength in at least one direction such that Weibull 50% strength probability is at least 400 MPa, more preferably at least 800 MPa, and more preferably at least 1 GPA, when measured at room temperature. It is more preferable that the Weibull modulus of a 2 mm×15 mm ceramic sheet with a similar composition as the higher strength area(s) of the electrolyte sheet have the bending strength of at least 2, more preferably, at least 4 and more preferably, greater than 6 (for example 7, 8, 9 or higher). Preferably, the electrolyte sheet 42 a thickness t in the thinnest areas of the electrolyte sheet of less than 45µ (and preferably less than 30µ), and has a height variation of less than 80 µm, more preferably less than 40 µm, and most preferably less than 20 µm in the thicker regions of the electrolyte sheet.

Electrolyte Sheet

Example 1

Figure 3A:
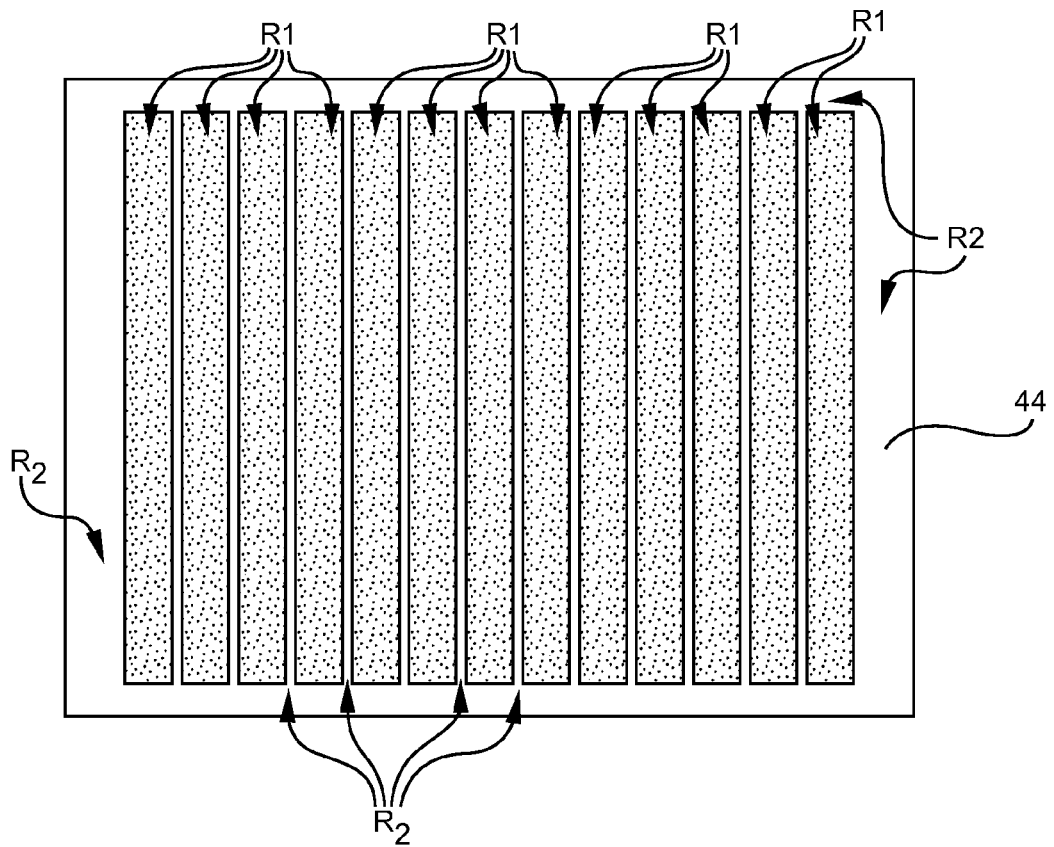
FIGS. 3A and 3B are a top schematic views of two exemplary electrolyte sheets according to the present invention.
Figure 3B:
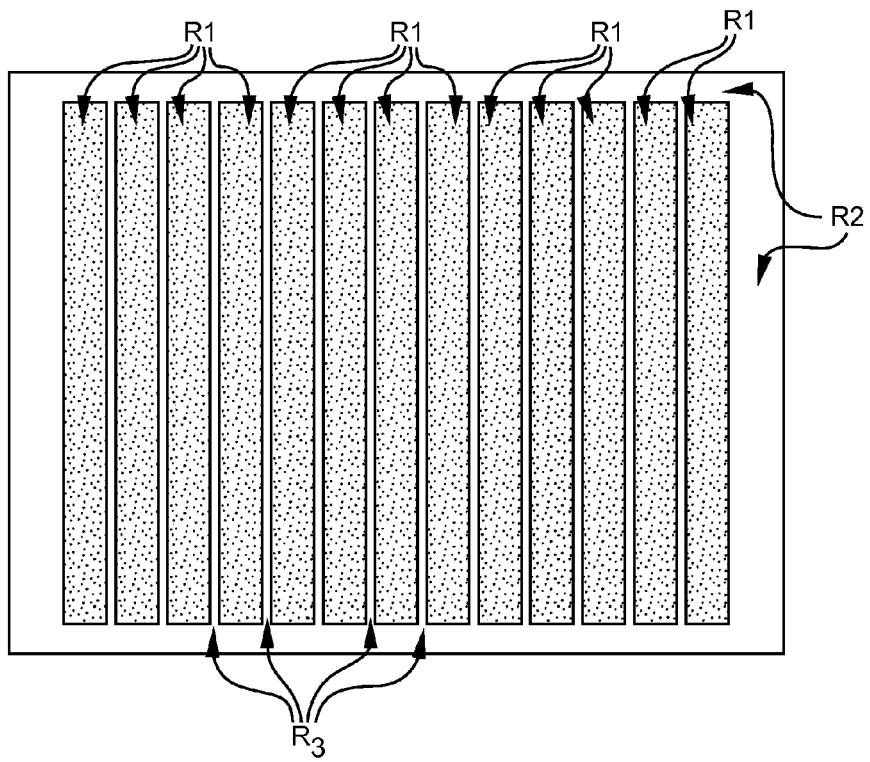

The embodiment of the electrolyte sheet 42 depicted in FIGS. 3A and 3B includes at least one region $R_1$ that has a higher ionic conductivity (e.g., the ionic conductivity of this region may be 10 mS/cm, more preferably greater than 20 mS/cm, even more preferably greater than 30 mS/cm) than at least one other region $R_2$, and wherein region(s) $R_2$ has lower ionic conductivity and higher strength than region $R_1$. In this example, region $R_2$ has Weilbull modulus of at least 3, preferably at least 6 and more preferably at least 9. Preferably, region $R_1$ have at least 1.5 times preferably and at least 2 times better ionic conductivity than the region(s) $R_2$. In this embodiment the high ionic conductivity electrolyte region(s) $R_1$ are sandwiched between cathodes and anodes, forming the electrolyte supported multiple fuel cells with improved ionic conductivity and high strength regions $R_2$ correspond to the areas subjected to large amounts of thermal-mechanical stress. In the embodiments of FIGS. 3A, 3B the electrolyte sheet is substantially flat with the thickness variation of less than 5 µm and preferably less than 3 µm and the regions of different composition are in "areal" arrangement—i.e., they are not laminated on top of one another so as completely cover one another and can be viewed when viewing one or two major surfaces $S_1$, $S_2$ of the electrolyte sheet 42. Other embodiments have surface features where the electrolyte thickness varies, for example, by 1 to 15 µm.

In the embodiment of FIG. 3A the regions or areas $R_2$ surround regions $R_1$ and are optimized for its mechanical properties (for example, strength). The regions with higher ionic conductivity (regions $R_1$) may be made, for example, of cubic zirconia, while the regions of higher strength (regions $R_2$) but lower ionic conductivity may include tetragonal zirconia, preferably more than 50% (per volume) of tetragonal phase zirconia, and even more preferably more than 75% (per volume) of tetragonal phase zirconia. Preferably the regions of highest strength or lowest ionic conductivity include at least 20% more volume of tetragonal phase zirconia then the (i) regions of highest ionic conductivity or (ii) lowest strength. More preferably the regions or areas of highest strength have at least 30% more volume, even more preferably at least 40% more volume, and most preferably at least 50% more volume of tetragonal phase zirconia then the regions or areas of highest ionic conductivity or lowest strength. For example, the region(s) with higher ionic conductivity (Region $R_1$) may include a composition selected from at least one of: Zirconia 6 to 10 mole % yttria (e.g., 8 mole % $Y_2O_3$); 6 to 10 mole % ytterbia (the higher is the dopant level of Y and/or Yb, the higher is the ionic conductivity); zirconia doped with Scandia (e.g., 10 mole % of $Sc_2O_3$). The other region (higher strength region, or region $R_2$) may include composition selected from at least one of: zirconia 3 mole % yttria; or Yttrium niobate doped zirconia, with at least 30% (and preferably at least 40% and more preferably at least 50%) of zirconia volume corresponding to tetragonal phase zirconia. For example, zirconia doped with 7-12 mole % scandia and zirconia doped with 8 mole % ytterbia have higher ionic conductivity than zirconia doped with 3 mole % yttria, while zirconia doped with lower levels of yttria (2-4 mole %, e.g., 3% $Y_2O_3$) has higher flexural strength then zirconia doped with 7-12 mole % scandia and/or 8 mole % ytterbia or 8 mole % yttria. Zirconia doped with 9-12 mole % ceria has higher toughness (i.e., higher resistance to crack propagation). Zirconia may also be doped with: (i) titania, calcia, and or magnesia to decrease material cost, to increase resistance to water corrosion at intermediate temperatures (i.e., temperatures between 100° C. and 400° C.), and (ii) yttrium (rare earth oxide, calcia and magnesia), niobate, tantalate, vandalate, tungstates, and/or molyb-denates in order to provide higher strength, and toughness and water vapor corrosion resistance, and/or (iii) tin oxide an/or indium oxide in order to provide potential water vapor corrosion resistance. It is preferred that the higher strength regions (e.g., $R_2$) of the electrolyte sheet 42 have a flexural (bend) strength of at least 400 MPa, more preferably at least 500 MPa, and most preferably at least 900 MPa when measured at room temperature.

The areas optimized for ionic conductivity can advantageously operate at lower temperatures, reducing the operating and improving durability of the fuel cell devices, while the areas optimized for higher mechanical strength, and advantageously improve SOFC device strength, thus resulting in easier device handling, manufacturing and improved device longevity.

For example, fuel cell devices 40 (see FIG. 2) may comprise of flexible electrolyte sheets 42 of 2-4 mole % $Y_2O_3$ doped-partially-stabilized $ZrO_2$ composition (with 30% to 100% of tetragonal phase zirconia, per volume of zirconia) provided with a total of 300 to 1000 via holes. Onto the first or anode sides of each of these electrolyte sheets 42, for example in Region $R_1$ (see FIG. 3A, 3B) are deposited arrays of anodes 44 (for example, 15 anodes), each comprising, for example, of 6-micron-thick Ni/$ZrO_2$ catalyst layers and 20-micron-thick layers of ceramic-powder-filled 90% Ag/10% Pd silver alloy, the powder filler comprising of 40% by weight of the $Y_2O_3$/$ZrO_2$ composition. Opposite the anodes 44 on the second or cathode sides of each flexible electrolyte sheet 42 are deposited arrays of cathodes 46, for example, 15 cathodes), each comprising, for example, of 6-micron-thick layers of $(La_{0.8}Sr_{0.2})0.98MnO_3$ containing 40% by weight of the $Y_2O_3$ doped $ZrO_2$ filler and a 20-micron-thick layer of Ag/Pd comprising 40% by weight powdered ceramic such as zirconia as a filler. The via holes, containing electrically conductive vias 48 connecting the leading edge of each anode 44 to the trailing edge of the cathode 46 in the next succeeding anode-cathode pair, are filled for example with 90% Ag/10% Pd alloy. The via holes are situated between the electrodes, for example, in the lower ionic conductivity regions $R_2$ of the electrolyte sheet 42 depicted in FIG. 3A.

The leads from the bus bars on the end of the electrode arrays are silver foils which are in turn attached to silver wires situated within a woven fiber tube insulation. The electrolyte sheet 42 is then sealed to the fuel frame 50 with the anode array facing inwardly into the fuel chamber. The seal may be, for example, with a glass or glass ceramic that can sinter to closed porosity below 900° C. while having a thermal expansion coefficient near that of the electrolyte sheet/fuel cell device.

Electrolyte Sheet

Example 2A

Figure 4:
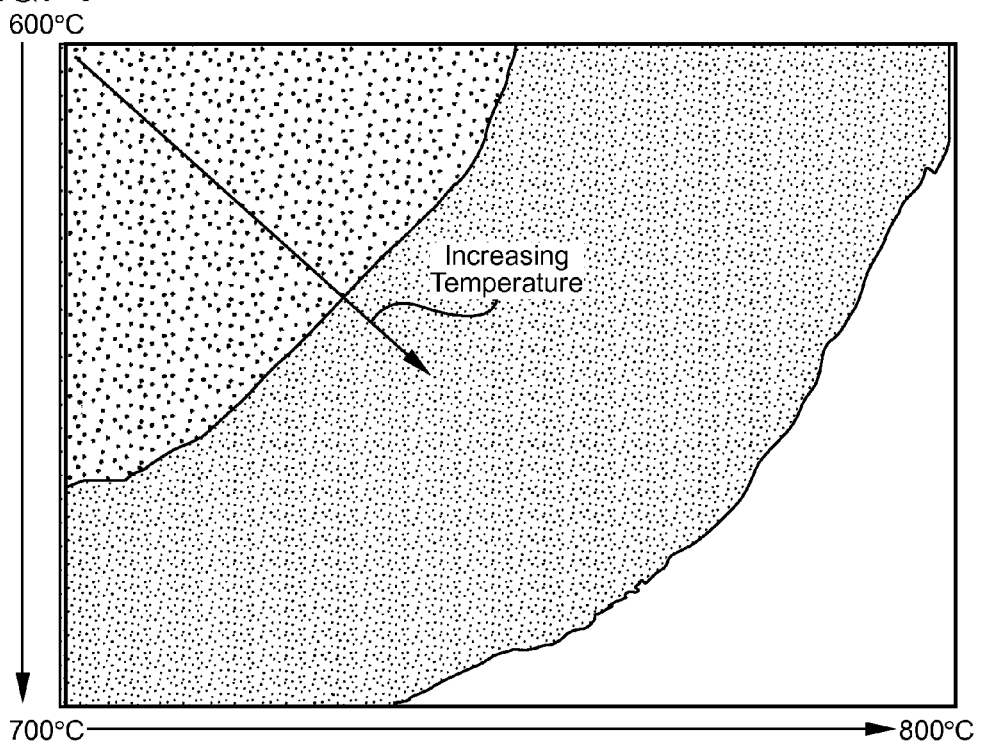
FIG. 4 illustrates an example of thermal gradient present in an exemplary fuel cell device which is operated in a cross flow configuration.
Figure 5A:
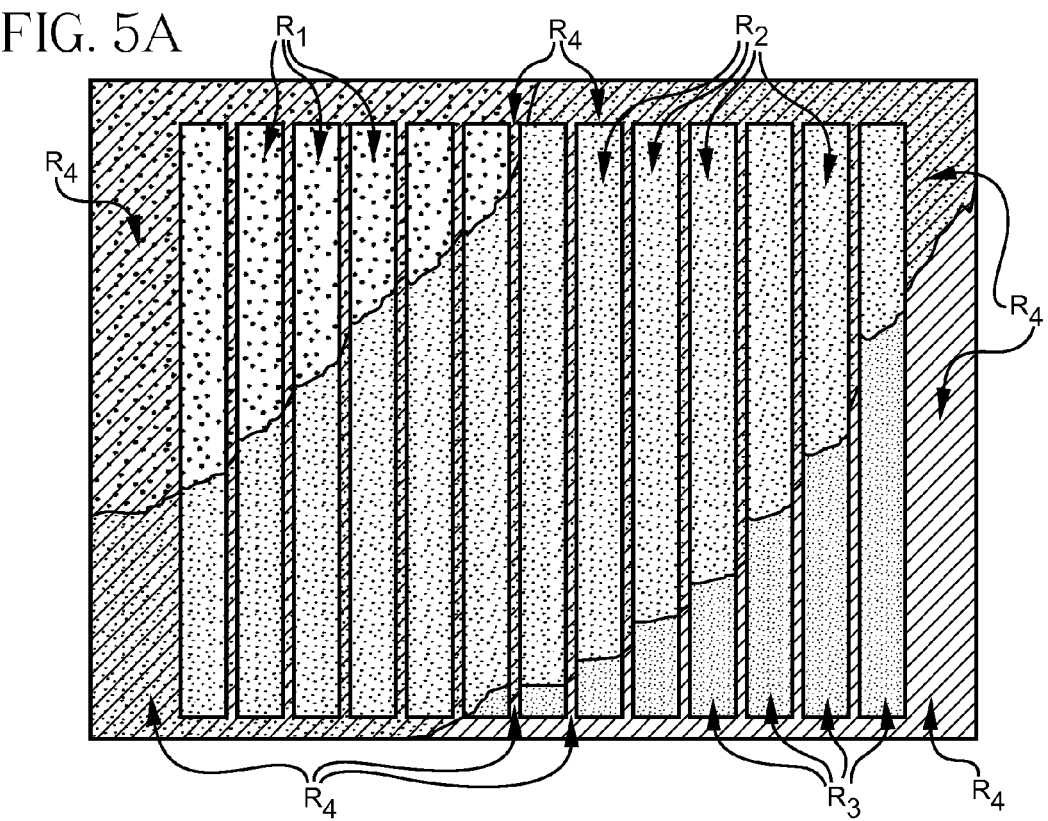
FIGS. 5A-5E illustrates exemplary electrolyte sheets optimized to operate under thermal conditions illustrated in FIG. 4.

The electrolyte sheet 42 may also be designed for optimized functioning in several different temperature zones. FIG. 4 illustrates an exemplary thermal gradient present in a fuel cell device 40 which is operated in cross-flow contribution (i.e., fuel and air flow direction are opposite one another, minimizing the amount of temperature variation). As shown in FIG. 4, in this embodiment the electrolyte sheet 42 operates in three temperature zones and thus includes at least three regions or areas of differing compositions. (See FIG. 5A. These regions may be, for example: at least one first region $R_{one}$ of scandia dopped zirconia (primarily cubic phase), which corresponds to the relatively low operating temperatures, at least one (second) region $R_{two}$ including ytterbia ($Yb_2O_3$) doped zirconia (primarily cubic phase) which corresponds to medium temperature range, and at least one (third) region $R_{three}$ including yttria doped zirconia (primarily cubic phase) which corresponds to the area subjected highest temperatures, and the fourth region $R_{four}$ corresponding to the "frame" area of the electrolyte sheet (area around the electrodes). In this embodiment region $R_{four}$ comprises tetragonal phase zirconia, and comprises preferably at least 20% more (and more preferably at least 50% more) tetragonal phase zirconia than region(s) $R_{one}$ or region(s) $R_{two}$. It is preferable that in region(s) $R_{four}$ more than 50% of zirconia be tetragonal (not cubic zirconia), because cubic zirconia is reasonably weak and does not provide desired or optimal strength (strength >400 MPa) to the electrolyte sheet areas that are subjected to higher stresses. It is noted that the areas of electrolyte sheet situated between the electrodes may also be comprised of the composition of region $R_{one}$, $R_{two}$ (e.g., zirconia doped with Scandia or Ytterbia). More specifically, in this embodiment, the four electrolyte sheet regions may comprise:

| Region 1 | Zirconia-90 mol % | Scandia 10 mol % |
| Region 2 | Zirconia-92 mol % | Ytterbia 8 mol % |
| Region 3 | Zirconia-92 mol % | Yttria 8 mol % |
| Region 4 | Zirconia-97 mol % | Yttria 3 mol % |

Electrolyte Sheet

Example 2B

Figure 5B:
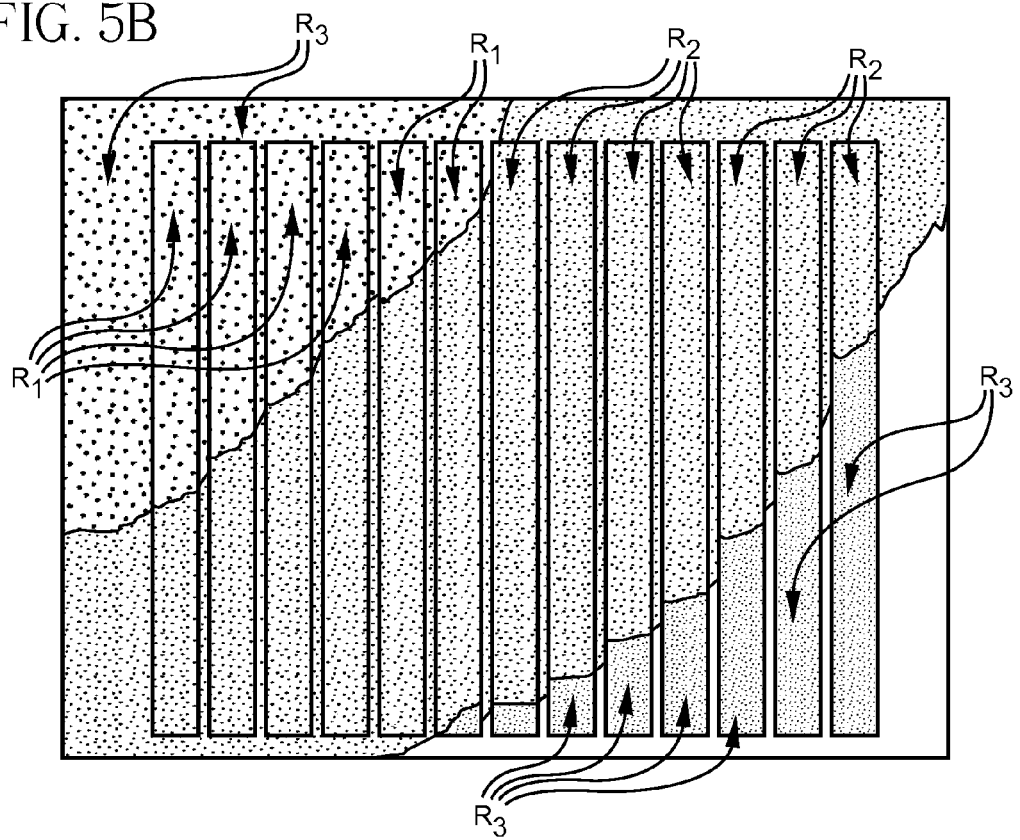

As discussed in the previous example, the electrolyte sheet 42 may be designed for optimized functioning in several different temperature zones. As shown in FIG. 4, in this embodiment the electrolyte sheet 42 operates in three temperature zones and thus includes at least three regions or areas of differing compositions. (See FIG. 5B). These regions may be, for example: at least one first region $R_{one}$ of scandia dopped (primarily cubic phase—i.e., more than 50% and preferably more than 80% of cubic phase zirconia) zirconia which corresponds to the relatively low operating temperatures, at least one (second) region $R_{two}$ including ytterbia ($Yb_2O_3$) doped zirconia which corresponds to medium temperature range, and at least one (third) region $R_{three}$ including yttria doped zirconia which corresponds to the area subjected highest temperatures and also the "frame" area of the electrolyte sheet (area around the electrodes). In this embodiment both regions $R_{two}$ and $R_{three}$ comprise tetragonal phase zirconia, and comprise preferably at least 20% more (and more preferably, at least 50% more) tetragonal phase zirconia than region(s) $R_{one}$. It is preferable that in regions $R_{two}$ and $R_{three}$ more than 50% of zirconia be tetragonal (not cubic zirconia), because cubic zirconia is reasonably weak and does not provide desired or optimal strength (strength >400 MPa) to the electrolyte sheet areas that are subjected to higher stresses. It is noted that the areas of electrolyte sheet situated between the electrodes may also be comprised of the composition of region $R_{one}$, $R_{two}$ (e.g., zirconia doped with Scandia or Ytterbia). More specifically, in this embodiment, the at least three electrolyte sheet regions may comprise:

| Region 1 | Zirconia-90 mol % | Scandia 10 mol % |
| Region 2 | Zirconia-97 mol % | Ytterbia 3 mol % |
| Region 3 | Zirconia-97 mol % | Yttria 3 mol % |

Figure 5C:
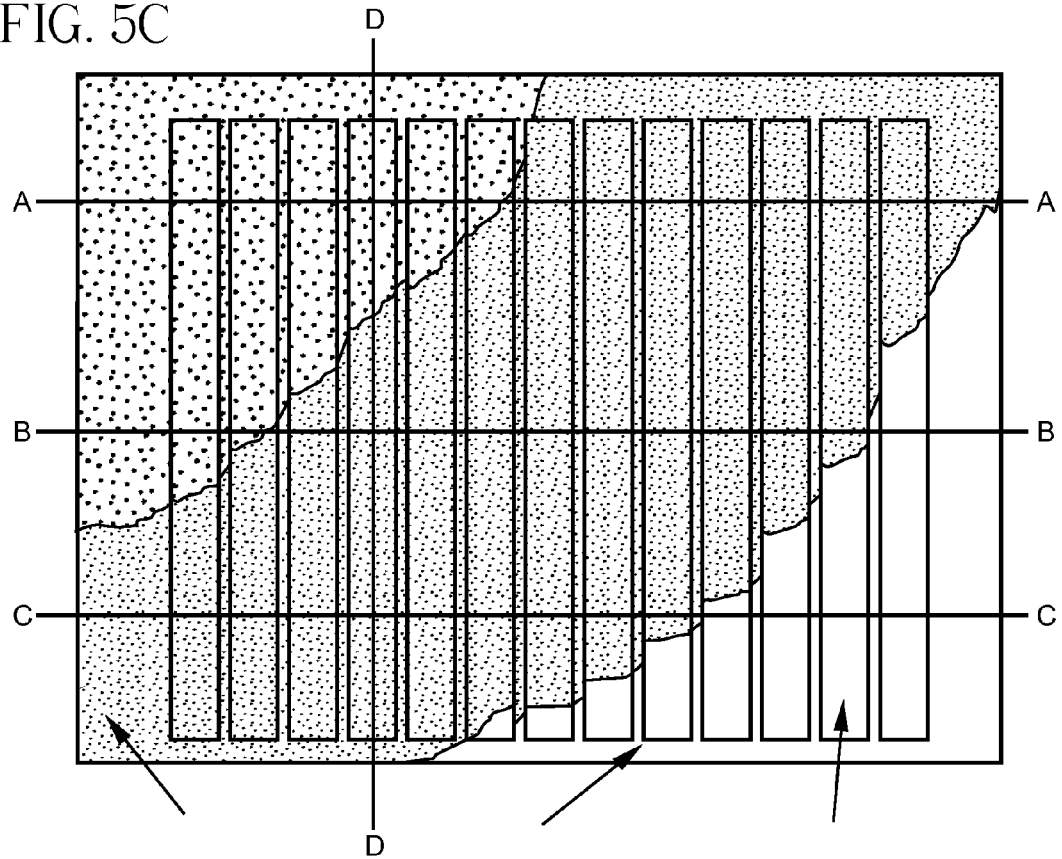
Figure 5D:
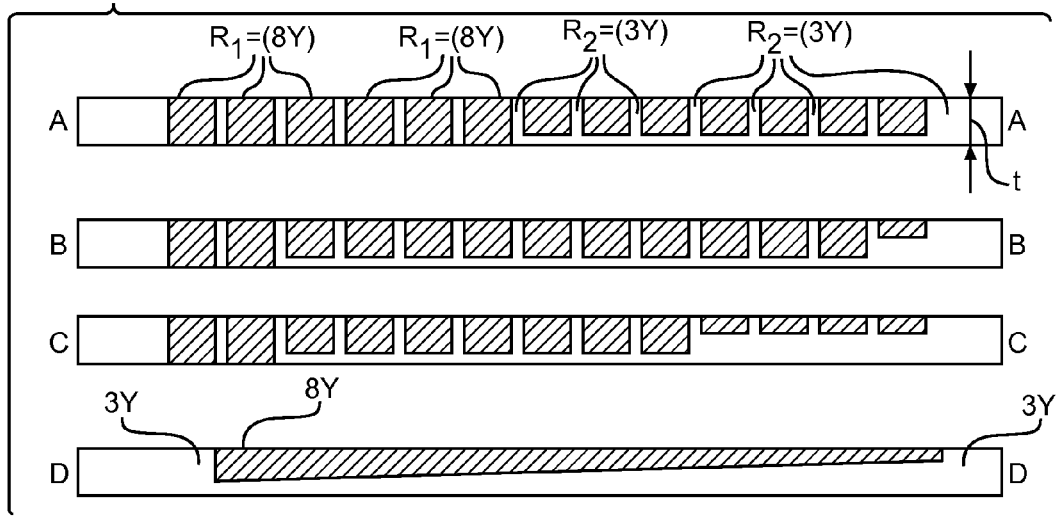
Figure 5E:
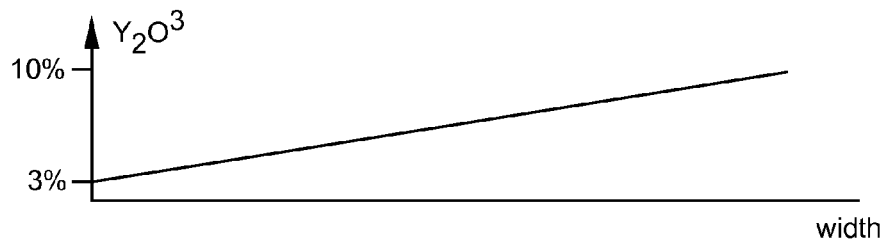

Alternatively, the electrolyte sheet may be a zirconia based electrolyte sheet gradually varying $Y_2O_3$ dopant concentration (e.g., from 10 mole % to 3 mole %), as shown in FIG. 5C-5D (where FIG. 5D illustrates cross-sectional views of the electrolyte sheet of FIG. 5C, along lines A-A, B-B, C-C and D-D.

Exemplary Methods of making electrolyte sheets with differently composed area:

First Exemplary Method

One method to produce the desired composition geometry in solid oxide electrolyte sheets includes the steps of:
  (i) Producing a green (i.e., un-sintered) electrolyte sheets by any known methods. This green electrolyte sheet will be of uniform composition, for example an un-doped zirconia, or zirconia doped with 3 mole % yttria.
  (ii) Adding dopants to the green electrolyte sheet to specific designated areas so as to create regions of different compositions.
  (iii) Sintering the resulting green sheet to produce solid oxide a ceramic electrolyte sheet.

This method results in the electrolyte sheet in which the regions of different composition are in "areal" arrangement and are not laminated on top of one another.

Figure 6A:
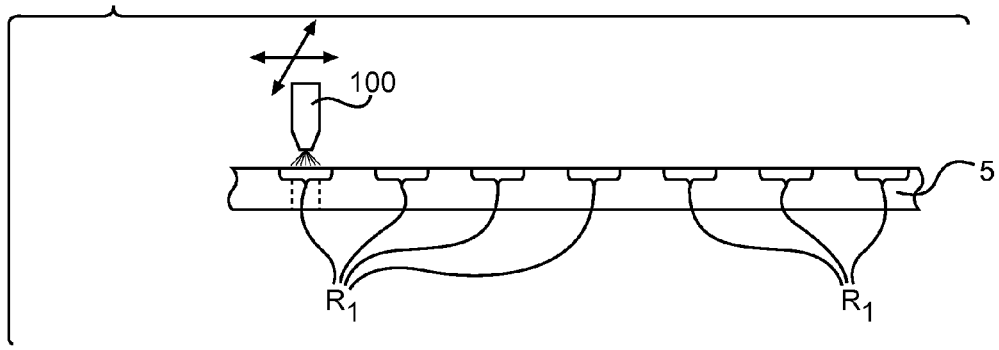
FIG. 6A illustrates impregnation of the electrolyte sheet with a dopant solution.

For example, if the green electrolyte sheet is zirconia doped with 3 mole % yttria, additional yttrium will be provided to the areas that require higher yttria concentration. This can be done, for example, by infiltrating the green electrolyte sheet with a solution containing yttrium oxalates, ytrrium nitrate, yttrium chloride, etc., to bring the yitria dopant level to 8 mole % in the areas designates as $R_1$ regions. If the green electrolyte sheet is un-doped zirconia, various dopants can be deposited on various selected areas of the electrolyte sheet, to create a green electrolyte sheet that has different composition areas. The dopant addition step can use any dopant infiltration process and may utilize an inkjet or another spray apparatus 100 to deposit dopant solution(s) on selected areas $R_i$ of the green electrolyte sheets 5. The (additionally) doped regions may, or may not extend through the entire thickness of the electrolyte sheet. (See FIG. 6A.) It is contemplated that either the green electrolyte sheet and/or the spray apparatus 100 may be in motion.

Second Exemplary Method

Another method to produce the desired composition geometry in solid oxide electrolyte sheets includes steps of:
  (i) Producing at least two green (i.e., un-sintered) pre-ceramic doughs of different compositions by any known methods and rolling it to a desired thickness.
  (ii) Calendaring one of the pre-ceramic doughs into a green sheet of the first composition.
  (iii) Cutting one or more areas out of the calendered green sheet of the first composition.

(iv) Placing either calendared sections of another composition into the cut out areas, or placing the green pre-ceramic dough of the second/other composition into the cutout sections.

(v) Rolling across sections to form a thin composite green electrolyte sheet having area $R_i$ with of different composition.

Figure 6B:
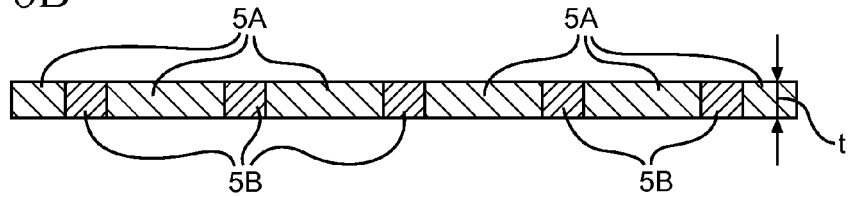
FIG. 6B illustrates an exemplary embodiment of a green electrolyte sheet made according to one exemplary method of the present invention.

(vi) Sintering the resulting composed green sheet to produce a ceramic solid oxide electrolyte sheet. A resulting exemplary electrolyte sheet is illustrated on FIG. 6B.

The cut out section size and shape, and the amount of green dough material of other compositions (or size and shape of calendered sections that will be placed into the cut out areas) should be sized and oriented to give the desired shape to the "other" composition areas once the thickness of the overall "composite" green sheet is reduced by rolling. This method also results in the electrolyte sheet in which the regions of different composition are in "areal" arrangement and they are not laminated on top of one another, and the thickness of the regions corresponding to the green material 5B is discontinuous—i.e., these region(s) exist in some portions of the electrolyte sheet, but not in others. Thus, when viewed through the crossection through two major surfaces $S_1$ and $S_2$, in this example the region(s) corresponding to the material 5B has a non-uniform surface thickness.

Third Exemplary Method

Another exemplary method to produce the desired composition geometry in solid oxide electrolyte sheets includes the steps of:

(i) Casting a first thin layer of fugitive polymer material (e.g., polymethyl-methacrylate) onto a Mylar substrate or Teflon based carrier, and optionally leveling or rolling it to a desired thickness.

(ii) Cutting off and removing the area(s) of fugitive polymer material to expose the Mylar substrate or the Teflon based carrier.

(iii) Casting a layer of the first green electrolyte material onto a Mylar substrate or Teflon based carrier, and optionally leveling or rolling it to a desired thickness. This layer may form, for example, the high strength areas of the electrolyte sheet (e.g., non-active area(s)).

Figure 7A:
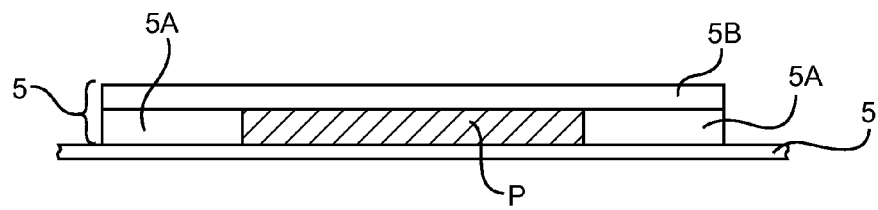
FIGS. 7A-7D illustrate several exemplary electrolyte structures.

(iv) Casting a second layer of different green electrolyte material over said first layer and the remainder of the of fugitive polymer material (the "window" area(s)), thereby creating a composite green sheet that includes two different green electrolyte compositions. (See FIG. 7A)

(v) Sintering the resulting composed green sheet to burn away the fugitive polymer material and to produce a ceramic solid oxide electrolyte sheet that includes (i) a high strength area(s), and (ii) a thinner, active, "window" area(s) that will be situated between the electrodes and that have higher ionic conductivity.

Figure 7B:
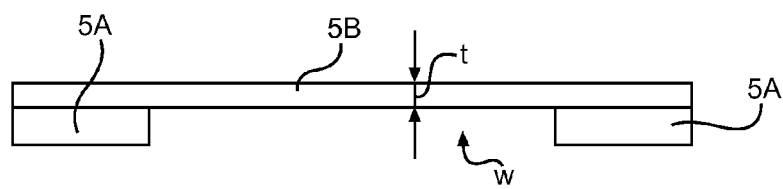

An exemplary electrolyte sheet made by this method is shown in FIG. 7B. As shown in FIG. 7B this method results in the electrolyte sheet in which the regions of different composition are situated or are laminated on top of one another. When viewed in cross-section taken through the major surfaces at least one of the regions exhibits a non-uniform thickness. In this example, the first green material forms a plurality of high strength regions $R_1$ of the specified thickness, and has a zero thickness in the "window area(s)" W, i.e., region(s) of higher conductivity.

A similar method may be utilized to make a tri-layer electrolyte sheet. This method includes the steps of:

(i) Casting a first thin layer of a fugitive polymer material onto a Mylar substrate or Teflon based carrier, and optionally leveling or rolling it to a desired thickness.

(ii) Cutting off and removing the area(s) of fugitive polymer material to expose the Mylar substrate or the Teflon based carrier. (See FIG. 7C)

(iii) Casting a layer of the first green electrolyte material onto a Mylar substrate or Teflon based carrier, and rolling it to a desired thickness. This layer may form, for example, the high strength areas of the electrolyte sheet (e.g., non-active area(s))

(iv) Casting a second layer of different green electrolyte material over said first layer and the remainder of the of fugitive polymer material (the "window" area(s)), thereby creating a composite green sheet that includes two different green electrolyte compositions.

(v) Casting a third thin layer, which is a layer of the fugitive polymer material, onto the second layer, and (optionally) leveling or rolling the third layer to a desired thickness.

(vi) Cutting off and removing the area(s) of fugitive polymer material to expose the second layer of green electrolyte sheet, while leaving a portion or portions of the figurative polymer layer to be situated over the remainder over the first polymer layer, with the second electrolyte layer sandwiched in between.

(vii) Casting a fourth layer using the first green electrolyte material over said second layer and around the remainder of said fugitive polymer layer situated on said second layer, thereby creating a composite green sheet that includes three different green electrolyte layers.

Figure 7C:
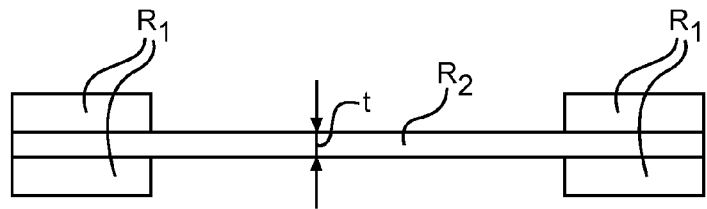

(viii) Sintering the resulting composed green sheet to burn away the fugitive polymer material and to produce a ceramic solid oxide electrolyte sheet that includes (i) a high strength area(s), and (ii) a thinner, active "window" area(s) that will be situated between the electrodes. An exemplary electrolyte sheet made by this method is shown in FIG. 7C.

Figure 7D:
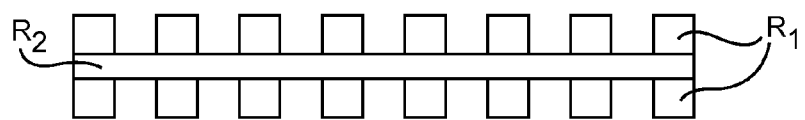

For example, a 75 micron thick Mylar substrate was coated with a thin, less than 1 micron, layer of methocel as a release agent and an acrylic (fugitive polymer) layer of about 25 microns was cast on this release layer using a 37 to 50 micron gap casting blade. A sharp knife was used to cut the acrylic into multiple "window" regions and a single "frame" region. The acrylic in the frame region was pealed off the Mylar carrier. A second methocel release layer was cast over the acrylic windows and frame area. A 12.5-25 micron gap (or similar gap) tape casting blade was used to cast a zirconia 3 mole % yttria ceramic slip over the remaining acrylic on the carrier. The height of the acrylic "windows" prevented the deposition of a layer of ceramic slip above them. After the "frame" ceramic layer was dried, a second layer of ceramic slip, zirconia with 6 or 8 mole % yttria was cast over the ceramic layer "frame" and the acrylic "windows" with the blade gap adjusted to give a thin layer of slip above the acrylic "windows". After drying the second ceramic layer, a last layer of acrylic was cast on the composite ceramic to give the cast composite sheet enough handling strength for removal from the Mylar. The casting was removed from the Mylar carrier and sintered in air at 1430 C for 2 hours in air. The resultant electrolyte structure is to that shown in FIG. 7B, with a continuous layer of zirconia 6-8 mole % yttria on top of a zirconia 3 mole % yttria frame. Another, similar electrolyte structure, with and without multiple "windows" regions $R_2$, is shown in FIGS. 7D and 7C, respectively.

In another exemplary embodiment, a green ceramic layer of undoped zirconia of about 20-25 microns thick is produced using a tape caster. A Teflon or Teflon coated carrier is transported under the casting blade and through a drying chamber to reduce or eliminate the amount of solvent in the cast zirconia based layer. One or more (e.g. two) spray bars with controlled nozzles, such as ink jet type sprayers, are fitted over the dry (drying) sheet as the sheet moves in the drying chamber. Frame areas are doped by being sprayed from the first bar in controlled patterns to allow a uniform doping of 3 mole % yttria in frame region while a second spray bar uniformly infiltrates a solution that will dope the "window" areas with 8 mole % ytterbia. After full drying, the green electrolyte sheet is removed from the carrier and sintered in air at about 1430 C for about 2 hours.

In yet another exemplary embodiment a thin 10-15 micron thick micro-textured sheet of zirconia 10 mole % scandia is tape cast with slightly more plasticizer (more than 3 wt %) typically used for making thin flexible ceramic sheets. An example of such plasticizer is dibutyl phthalate. Two sheets of zirconia doped with 3.5 mole % yttria with a thickness of about 10-20 microns are made with equivalent "window" areas W cut out of both sheets. The 3.5% moles % sheets are aligned so that the "window" areas match, the scandia doped sheet is placed in the middle and the three sheets are laminated at an elevated temperature and then sintered at about 1430 C in air. A structure similar to that shown in FIG. 7D (without the polymer) results.

Fourth Exemplary Method

Figure 8A:
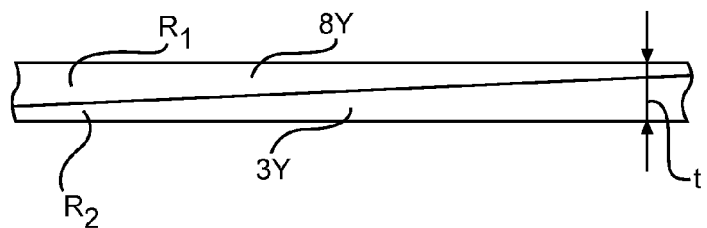
FIGS. 8A-8B illustrates another embodiment of the exemplary electrolyte sheet.
Figure 10A:
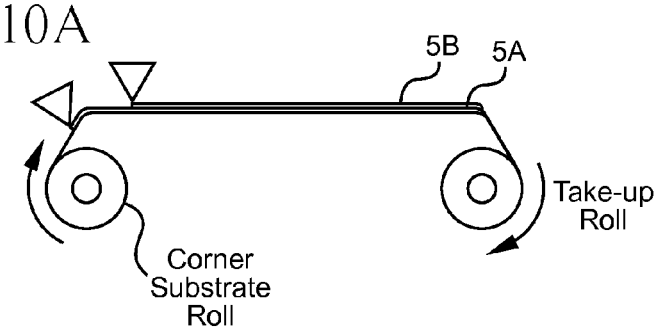
FIGS. 10A, 10B and 10C illustrate three exemplary embodiments of methods of making exemplary electrolyte sheets according to the present invention.

Another method to produce the desired composition geometry in solid oxide electrolyte sheets includes steps of:
(i) Casting a layer of the first green electrolyte material onto a Mylar substrate or Teflon based carrier, and rolling it to a desired thickness. The thickness of the layer may be different at different locations and may be gradually changing, for example from edge to edge, or corner to corner. This layer may be composed, for example, of zirconia with 3 mole % yttria.
(ii) Casting a second layer of different green electrolyte material over the first layer thereby creating a composite green sheet that includes two different green electrolyte compositions. This second layer may be composed, for example, of zirconia with 8 mole % yttria and may have different thickness areas. (See FIG. 10A).
(iii) Sintering the resulting composed green sheet to burn away the fugitive polymer material and to produce a ceramic solid oxide electrolyte sheet that includes two layers of different compositions. An exemplary electrolyte sheet made by this method is shown in FIG. 8A. Because the 3Y layer (which includes at least 30% of volume of tetragonal phase zirconia) has better mechanical properties than the 8Y layer but the 8Y layer has about twice the oxygen ion conductivity of 3Y, the resultant composite electrolyte sheet is optimized to simultaneously provide optimized strength and conductivity.

This method results in the electrolyte sheet in which the regions of different composition are laminated on top of one another, in which the layers are preferably of non-uniform thickness.

Figure 8B:
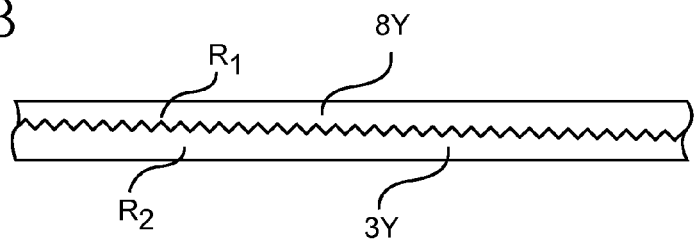

Optionally, before the second layer of different green electrolyte material is cast over the first layer, a patterned roller may be utilized to emboss the surface of the first layer, which also improves interlayer adhesion. The resultant electrolyte sheet is illustrated schematically in FIG. 8B. In addition, it may be beneficial to have some residual solvent left in the first layer, before casting the second layer, which also improves interlayer adhesion.

Figure 9A:
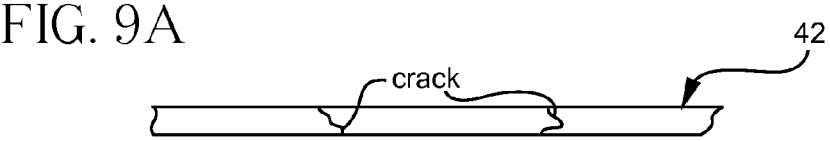
FIGS. 9A, 9B and 9C illustrate schematically existence of cracks in a one layer Prior Art electrolyte sheet, and in a multiple layer sheet.
Figure 9B:
Figure 9C:
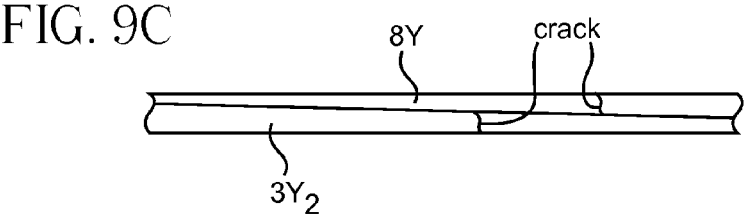

Preferably the electrolyte sheet 42 is a thin electrolyte sheet, with a thickness (measured across the thinnest area of the electrolyte sheet 42) is less than 45 μm, and more preferably less than 30 μm, and even more preferably, less than 25 μm. As the thickness of the electrolyte sheet gets smaller, it exhibits less ionic resistance (and thus better ionic conductivity). However, it will also be more fragile. If the electrolyte sheet is made of only one layer, a single defect in a single cast can cause a crack (or a hole) to exist through an entire thickness of the electrolyte sheet. (See FIG. 9A) With two or more casts, an electrolyte sheet is made of multiple layers, is more durable, and the probability of defects aligning within the two electrolyte layers of different casts and different compositions is much smaller. (See FIGS. 9B, 9C)

Fifth Exemplary Method

Figure 10B:
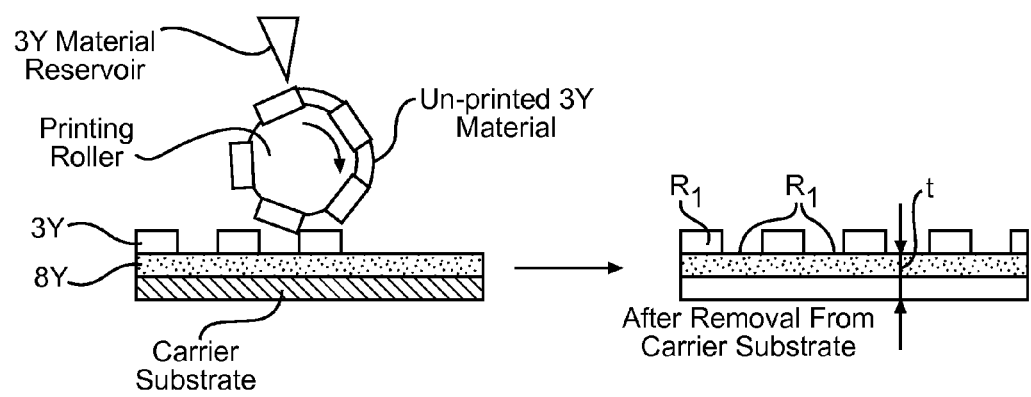

Another method to produce the desired composition geometry in solid oxide electrolyte sheets (See FIG. 10B) includes steps of:
i. Casting a layer of the first green electrolyte material onto a carrier S, and rolling it to a desired thickness. This layer may be composed, for example, of zirconia with 8 mole % yttria (i.e., 8Y).
ii. Utilizing a patterned roller to deposit another, different green electrolyte material, over the desired areas of the first layer thereby creating a composite green electrolyte sheet. This layer may be composed, for example, of zirconia with 3 mole % yttria (i.e., 3Y).
iii. Drying the composite green electrolyte sheet.
iv. Removing the dried composite green electrolyte sheet from the carrier substrate.
v. Sintering the composite green sheet to produce a ceramic solid oxide electrolyte sheet that includes at least two areas of different compositions.

This method results in the electrolyte sheet in which the regions of different composition are in "areal" arrangement—i.e., different compositions can be seen by viewing at least one of the major surfaces of the electrolyte sheet and the two layers are not uniform thickness layers that are situated on top of one another. That is, and the electrolyte material deposited by the pattern roller does not have a uniform thickness through the electrolyte sheet (i.e., it is present in some areas and not in others).

Sixth Exemplary Method

Figure 10C:
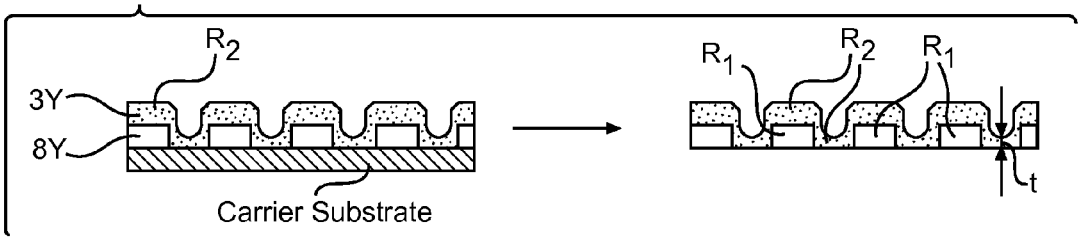

Another method (See FIG. 10C) to produce the desired composition geometry in solid oxide electrolyte sheets includes steps of:
i. Utilizing a patterned roller to a first green electrolyte material onto a carrier. This layer may be composed, for example, of zirconia with 3 mole % yttria.
ii. Casting a continuous layer of second green electrolyte material over said first material. This second layer may be composed, for example, of zirconia with 8 mole % yttria.
iii. Drying the composite green electrolyte sheet
iv. Removing the dried composite green electrolyte sheet from the carrier substrate;
v. Sintering the composite green sheet to produce a ceramic solid oxide electrolyte sheet that includes at least two areas of different compositions.

This method results in the electrolyte sheet in which the regions of different composition are in "areal" arrangement—i.e., they are not simply laminated on top of one another. When viewed in cross-section taken through said major surfaces at least one of these regions exhibits a non-uniform thickness. For example, the first layer/region created by a patterned roller has a non-uniform thickness, because it is discontinuous (e.g., present in some parts, but not in others).

The fuel cell assembly 10 incorporates the fuel cell device (s) 40 supported by the frame module 50. The fuel cell device 40 comprises the electrolyte sheet 42 that includes at least two areas of different compositions, at least one of which provides additional strength to the electrolyte sheet and the composition of that area preferably has the flexural (or bend) strength of at least 400 MPa, preferably at least 500 MPa, more preferably at least 700 MPa and most preferably at least 900 MPa when measured at room temperature. (That is, an electrolyte sheet strip 2 mm by 1.5 cm of this composition will exhibit such flexural strength.) The frame module 50 of the embodiment of FIGS. 1A-1C includes two frames 50A, 50B. A number of different frame constructions can usefully be employed for the construction of fuel cell assemblies 10 in accordance with the invention. For example, the frames 50A, 50B may be constructed of machined metal parts, or stamped metal framing can be used. Further, laminated frames incorporating combinations of metal and/or ceramic (glass, glass-ceramic and/or ceramic) materials can be used for better thermal expansion matching to the electrolyte sheets 42 or better compatibility with other elements of the SOFC assembly 10.

The embodiments of the fuel cell assembly utilize frame modules 50 made of components that that have the appropriate thermal expansion, compatible to that of the electrolyte sheets 42, and/or the fuel cell devices 40. Exemplary ceramic electrolytes sheets 42 of partially-stabilized zirconia composition have a average linear thermal expansion coefficient (CTE) of about 11.0 to 11.5 ppm/° C. in the temperature range of 25-750° C. Materials having use temperatures as high as 750° C. and with the required CTE are rare. Chrome-iron and Cr—Ni alloys are representative of alloys known in the art for use in fuel cell devices, both for interconnects and for framing materials. These alloy families include such metals as the above-described Plansee ITM alloy as well as Type 446 high chrome stainless steel (see Piron et. al., Solid Oxide Fuel Cells VII (2001). p. 811) Ferritic stainless steels have average CTEs in the range of 10-12 ppm/° C. (Metals Handbook (1948). Examples include Type 430 stainless steel containing 14-18% Cr, remainder Fe, with a reported CTE of about 11.2 ppm/° C. and a maximum use temperature of about 815° C., as well as Type 446 stainless steel containing 23-27% Cr, remainder Fe, with a CTE of about 11.0 ppm/° C. and a maximum use temperature of about 1100 C.

The frame module 50 of FIGS. 1A-1C supplies fuel and air uniformly to the device 40 by means of inlet orifices 51A (fuel), 51B (air), distribution chambers 52A (fuel), 52B (air) such as a biscuit-cut gas expansion chambers, exit ports 53A (fuel), 53B (air) such as a biscuit-cut gas chambers, and final outlets 54A (fuel), 54B (air). FIG. 1B illustrates schematically that the frame 50A is a fuel frame and that the frame 50B is the air frame. The frames 50A, 50B also form, in conjunction with the fuel cell device 40, fuel chamber 30 and air chamber 30'. The fuel flows into the frame module 50 through the inlet orifice 51A which provides it to the fuel distribution chamber 52A (e.g. biscuit cut in the frame 50A) and then into the fuel chamber 30, pass the anode(s). The (at least partially) spent fuel is provided to the fuel exit ports 53A (e.g., a biscuit cut) and exits trough the final outlet 54A. The oxidant moves through the frame 50B in a similar manner. In the embodiment illustrated in FIG. 1A-1C air and fuel move in a counter-flow direction. However, fuel/air co-flow and cross flow configurations are also possible.

Other features of the portable fuel cell assembly of the invention contribute to limiting operating stresses on the device(s) 40. Primary stresses arising in the course of using these devices include thermal-mechanical and pressure-differential-induced stresses, the former being particularly problematic during device start-up and shut-down. Sources of thermal-mechanical stress include thermal expansion mismatch among the fuel cell assembly components, thermal lag (the frame heats more slowly than the rest of the device because of thermal mass), and thermal gradients from device operation. Leakage can also be a source of thermomechanical stress in that undesired burning of fuel creates local hot spots or general heating. Having a fuel cell device that can operate at lower temperatures and simultaneously has an improved strength improves the device reliability under mechanical and/or thermal stresses.

The maximum temperature differential across the fuel cell device 40 can be effectively reduced by adopting a counter-flow distribution scheme for the air and fuel gases. This scheme can physically move peak internal temperatures with respect to the discharge ends of the fuel cell assemblies. The resulting reductions in maximum temperature differentials across the assembly facilitates the maintenance of a much narrower operating temperature window, thereby maximizing cell performance and minimizing material degradation. This is particularly helpful for electrode designs incorporating silver or other materials adversely affected by over-temperature cell operation. Utilizing the cross-flow fuel/air configuration while optimizing the multi-cell supporting electrolyte sheet improves the efficiency of the fuel cell device and also improves its longevity. It is noted that with either a co-flow, or counter flow designs, the electrolyte composition variation would be preferably more linear, i.e., it would change from center to edge, or edge to edge rather than corner to corner as in the cross flow case.

The present invention is not restricted to any particular families of electrode, current collector or cell interconnect materials. Thus structures such as are typically formed of wire or mesh of platinum, platinum alloy, silver, or other noble metal, nickel or nickel alloys can be used, as can coatings or patterned layers of these materials or materials such as strontium-doped lanthanum chromates or refractory metal cermets. These conductive structures may act as current collectors which are provided on top of, beneath, or along side electrode layers or they may act as interconnects between layers.

Among the electrode materials useful in combination with pre-sintered electrolytes are cermet materials including metals and ionically conducting ceramics such as nickel/yttria stabilized zirconia cermets, noble metal/yttria stabilized zirconia cermets, these being particularly useful, but not being limited to use, as anode materials. Useful cathode materials include such ceramic and cermet materials as strontium-doped lanthanum manganite, other alkaline earth-doped cobaltites and manganites, ferrites, including combinations of electronic conducting ceramics and ionically conducting ceramics as strontium-doped lanthanum manganite, other alkaline earth-doped cobaltites and manganites, ferrites, with zirconia or ceria as well as noble metal/yttria stabilized zirconia cermets. Of course the foregoing examples are merely illustrative of the various electrode and interconnect materials which could be used.

Cathode and anode materials useful for fuel cell construction in accordance with the invention are preferably composed of highly conductive but relatively refractory metal alloys, such as noble metals and alloys amongst and between the noble metals, e.g., silver alloys. Examples of specific alloy electrode compositions of this type include silver alloys selected from the group consisting of silver-palladium, silver-platinum, silver-gold and silver-nickel, with the most preferred alloy being a silver-palladium alloy.

Alternative electrode materials include cermet electrodes formed of blends of these metals or metal alloys with a polycrystalline ceramic filler phase. Preferred polycrystalline ceramic fillers for this use include stabilized zirconia, partially stabilized zirconia, stabilized hafnia, partially stabilized hafnia, mixtures of zirconia and hafnia, ceria with zirconia, bismuth with zirconia, gadolinium, and germanium.

Of course, the foregoing description and examples are merely illustrative of the invention, it being apparent to those of skill in these arts that numerous variations and/or modifications of the particular materials, devices and methods hereinabove described may be resorted to for the practice of the invention as set forth in the following claims.

We claim:

1. An electrolyte sheet comprising two major surfaces, said electrolyte sheet having regions of differing compositions, so that (i) at least one of said regions has at least 1.5 times higher ionic conductivity than at least one other region; (ii) wherein said at least one other region has 20% more tetragonal phase zirconia per volume than said at least one region with higher ionic conductivity; and (iii) when viewed in cross-section taken through said major surfaces at least one of said regions exhibits a non-uniform thickness.

2. The electrolyte sheet having regions of differing compositions according to claim 1, wherein (i) the at least one of said regions with higher ionic conductance includes a composition selected from at least one of: zirconia 6-10 mole % yttria; 6-10 mole % ytterbia, lutetia, erbia, thulia; zirconia doped with 7-12 mol % scandia; and mixtures of zirconia 6-10 mole % yttria; 6-10 mole % ytterbia, lutetia, erbia, thulia; zirconia doped with 7-12 mol % scandia; and (ii) at least one other region has higher strength and includes a composition selected from at least one of: zirconia 2-4 mole % yttria; zirconia 2-4 mole % yttria or rare earth oxide (oxides of Nd, Sm, Eu, Gd, Tb, Dy, Ho, Er, Tm, Yb, Lu); zirconia doped with 9-12 mole % ceria; zirconia doped with 1.5-5 mole % yttria or rare earth oxide and 0.5-15 mole % yttrium, or rare earth niobate, or yttrium, or rare earth tanatalate (i.e. $YNbO_4$); zirconia doped with 1.5-5 mole % yttrium or rare earth oxide and 0.5-15 m % rare earth, or magnesium or calcium, tungstate, yttrium or rare earth, or magnesium, or calcium molybdnate ($CaWO_4$); or zirconia doped with 0.5-4 mole % yttria or rare earth oxide and 5-20 mole % $TiO_2$ or $SnO_2$ and mixtures there of.

3. The electrolyte sheet having regions of differing compositions according to claim 2, wherein said regions contain less than 10 volume percent alumina.

4. The electrolyte sheet according to claim 1, said electrolyte sheet having a plurality of regions of higher ionic conductivity and at least one region with lower ionic conductivity.

5. A solid oxide fuel cell device comprising:
   (i) at plurality of anodes,
   (ii) at plurality of cathodes;
   (iii) a solid oxide electrolyte sheet of claim 4 disposed between said anodes and cathodes, such that said regions of higher ionic conductivity are sandwiched between said cathodes and said anodes.

6. The electrolyte sheet according to claim 4, wherein said plurality of regions with higher ionic conductivity include a composition selected from at least one of: zirconia doped with 6-10 mole % yttria; zirconia doped with 6-10 mole % ytterbia; zirconia doped with 7-12 mole % scandia.

7. An electrolyte sheet comprising two major surfaces, said electrolyte sheet having regions of differing compositions, so that (i) at least one of said regions has at least 1.5× higher ionic conductivity than at least one other region; (ii) the least one other region has higher strength than said at least one of said regions with higher ionic conductivity, wherein said at least one other region with higher strength has 20% more tetragonal phase zirconia per volume than said at least one region with higher ionic conductivity; and (iii) when viewed in cross-section taken through said major surfaces at least one of said regions exhibits a non-uniform thickness.

8. The electrolyte sheet having regions of differing compositions according to claim 7, wherein the at least one of said regions with higher ionic conductivity includes 8 mole % ytterbia.

9. The electrolyte sheet having regions of differing compositions according to claim 7, wherein the at least one of said regions with higher ionic conductivity includes a composition selected from at least one of: zirconia doped with 6-10 mole % yttria; zirconia doped with 6-10 mole % ytterbia; zirconia doped with 7-12 mole % scandia.

10. The electrolyte sheet having regions of differing compositions according to claim 7, wherein the at least one at least one other region includes a composition selected from at least one of: zirconia doped with 2 to 4 mole % yttria; zirconia doped with 2-4 mole % rare earth oxide (oxides of Nd, Sm, Eu, Gd, Tb, Dy, Ho, Er, Tm, Yb, Lu); zirconia doped with 9-12 mole % ceria, zirconia doped with 1.5-5 mole % yttria or rare earth oxide and 0.5-15 mole % of yttrium or rare earth niobate or rare earth tanatalate (i.e. YNbO4), or zirconia doped with 0.5-4 mole % yttria or rare earth oxide; and zirconia doped with 5-20 mole % TiO2 or SnO2 and mixtures there of.

11. The electrolyte sheet having regions of differing compositions according to claim 7, comprising at least 3 regions, the first region including scandia doped zirconia, the second region including ytterbia doped zirconia, the third region including yttria doped zirconia.

12. The electrolyte sheet having regions of differing compositions according to claim 7, wherein said electrolyte sheet is a zirconia based electrolyte sheet with at least two different areas having different levels of yttria.

13. A solid oxide fuel cell device comprising:
   (i) at least one anode,
   (ii) at least one cathode;
   (iii) a solid oxide electrolyte sheet of claim 7 disposed between said anode and cathode.

14. The solid oxide fuel cell device of claim 13, wherein said electrolyte sheet has a plurality of regions with said higher ionic conductivity and at least one region with lower ionic conductivity.

15. The electrical power-generating solid oxide fuel cell assembly comprising:
   a) an enclosed interior formed at least in part by one or more compliant electrolyte sheets according to claim 7;
   b) one or a plurality of anodes disposed within the enclosed interior and supported on an interior facing surface of the compliant solid oxide sheet;
   c) one or a plurality of cathodes supported on an other surface of the compliant solid oxide sheet at locations generally opposite the anodes on the interior surface;

d) fuel delivery means for supplying a fuel gas to the enclosed interior; and e) electrically conductive material connected to the anodes and cathodes for drawing electrical current from the assembly.

16. The electrical power-generating solid oxide fuel cell assembly according to claim 15 wherein said at least one other region of said electrolyte sheet with higher strength is situated adjacent to the perimeter of the electrolyte sheet, and wherein said plurality of anodes and cathodes are situated on opposing sides of said electrolyte regions of higher ionic conductivity.

17. The electrolyte sheet according to claim 7, wherein at least one of said major surfaces of said electrolyte sheet has regions of different compositions, some of said regions having higher ionic conductivity than said one at least one other region.

18. The electrolyte sheet according to claim 16, wherein said electrolyte sheet is substantially flat with the thickness variation of less than 3 μm.

19. The electrolyte sheet according to claim 17 wherein said at least one other region with higher strength is situated adjacent to the perimeter of the electrolyte sheet.

20. The electrolyte sheet according to claim 1 wherein said regions of different compositions correspond to different layers of the electrolyte sheet, and wherein said electrolyte sheet has a plurality of regions with a higher ionic conductivity than said at least one other region.

21. The electrolyte sheet according to claim 13 wherein said at least one other region with higher strength is situated adjacent to the perimeter of the electrolyte sheet.

* * * * *